Feb. 18, 1941.    E. E. TISZA    2,232,284
POLARITY INDICATOR
Filed March 20, 1940
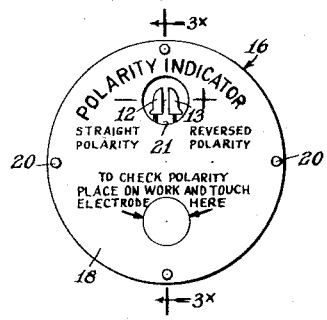
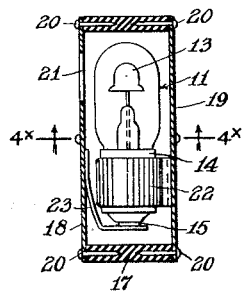
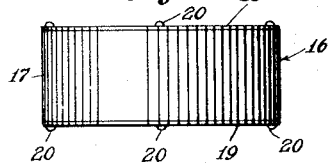
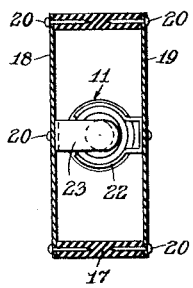
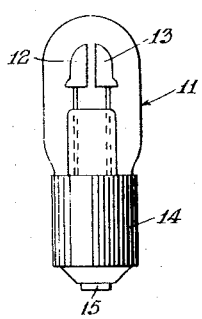
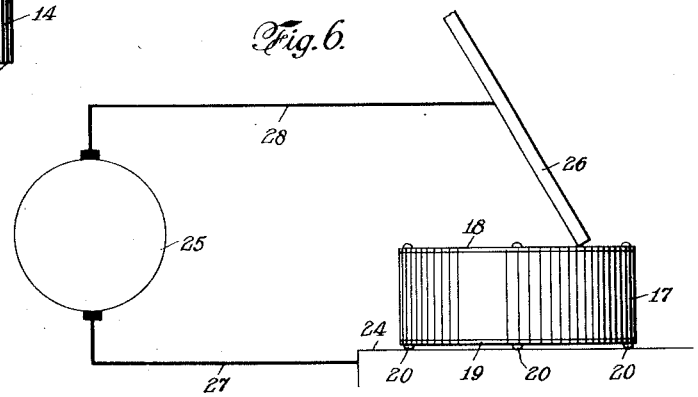
INVENTOR.
Ernest E. Tisza
BY Williams, Rich & Morse
ATTORNEYS Patented Feb. 18, 1941

2,232,284

UNITED STATES PATENT OFFICE 2,232,284

POLARITY INDICATOR

Ernest E. Tisza, New York, N. Y., assignor to Air Reduction Company, Incorporated, New York, N. Y., a corporation of New York Application March 20, 1940, Serial No. 324,966

2 Claims. (Cl. 175—183)

The present invention relates to a polarity indicator for use in direct-current arc welding.

Welding operations are carried out with the direct current flowing in the arc either from the electrode to the work or from the work to the electrode, depending on the type of welding electrode employed. In the case of bare steel electrodes, for example, the work is generally connected to the positive side of the welding generator and the electrode to the negative side, which results in flow of current from the work to the electrode. This condition is referred to as "straight polarity." When using either nonferrous or coated electrodes, however, the work is made negative and the electrode positive, which means that flow of current is from the electrode to the work. This is known as "reversed polarity." For practical reasons, the electrical connections required to adapt the welding circuit to either one of these conditions are effected by control at the generator itself, as by a reversing switch assembled with the rest of the equipment.

Naturally, the operator may on various occasions wish to check or ascertain the polarity setting of the generator, e. g., before starting a welding operation or after changing from one type of electrode to another. Generally, he has hitherto had to go to the generator for this purpose, which has obviously been troublesome and time-consuming, especially where welding is carried out at remote points from the generator, as is very often the case. Quite some time has been lost in this manner in welding operations.

The invention has for its object to provide a small portable device of simple construction by which the polarity setting of the generator in direct-current arc welding may be readily determined by the operator at the place where welding is being performed.

The invention involves the use of a glow lamp having interior spaced electrodes which may be temporarily interposed in the welding circuit between work or working table and the welding electrode. It is a known property of such glow lamps that, when connected in a direct-current circuit, light is emitted only from that one of the spaced electrodes therein which is connected to the positive side of the circuit. The invention makes use of this property in such a manner that the device as a whole is adapted to be carried in the pocket of the operator ready for immediate service by merely resting it on any part of the work or working table. To these ends there is provided for the glow lamp a housing having upper and lower exposed terminals in electrical connection with the lamp's interior electrodes which may be observed through an upper window in such housing, it being a feature of the invention that the lower housing terminal is adapted to make contact with the work or working table, while the upper housing terminal may be touched with the welding electrode. In order to determine the polarity setting of the generator, all the operator has to do is to set the device on the work or working table, bring the welding electrode into contact momentarily with the upper housing terminal, and observe the effect of this momentary connection on either one of the lamp's electrodes.

A practical embodiment of the invention is illustrated in the accompanying drawing in which Fig. 1 is a plan view of the device; Fig. 2 is a side elevation thereof; Figs. 3 and 4 are respectively sections taken on the lines $3x$—$3x$ and $4x$—$4x$ of Figs. 1 and 3, with the interior parts shown in full; Fig. 5 is an enlarged view of a form of glow lamp suitable for use in the device; and Fig. 6 is a schematic view of the device in operation.

The numeral 11 has reference to an ordinary neon-filled lamp whose interior electrodes 12 and 13 are connected in the usual way to an outer metallic shell 14 and center contact 15, as best shown in Fig. 5. It is understood, of course, that there may be used any other form of glow lamp which is provided with interior electrodes in spaced relation to each other. Moreover, it is not necessary that the lamp used be filled with neon gas. Generally stated, the gaseous medium may be any which will ionize at comparatively low voltage. Mercury vapor is thus suitable, although neon gas is preferred from the standpoint of economy.

Referring to Figs. 1 to 4, the lamp 11 is shown fitted in a circular housing 16, which comprises as one of its elements an annular band 17 of suitable insulating material, such as fiber. As further elements, the housing 16 comprises upper and lower metal discs 18 and 19 of a diameter enabling them to be respectively attached to the upper and lower edges of the annular band 17, as by metal brads 20. These discs (together with their securing brads 20) constitute the upper and lower terminals of the device. As shown, the upper disc 18 is formed with an opening 21 in direct alignment with the lamp electrodes 12 and 13 for their inspection by the operator.

The lamp 11 is held in a horizontal position within the housing 16 by means of a U-shaped clip 22 which is adapted to grip the metallic shell 14 and which is secured to the inside surface of the lower disc 19 by soldering or other means. Thus one of the lamp electrodes 12 or 13 is connected to the lower disc 19. Adapted to yieldingly bear against the inside surface of the upper disc 18 is a metallic strip 23 secured by soldering at its inner end to the center lamp contact 15. The other of the electrodes 12 or 13 is thereby connected to the upper disc 18. If desired, the shell 14 may be soldered in the clip 22 as a further precaution against longitudinal or rotational movement of the electrodes 12 and 13 from their proper position relative to the opening 21 in the upper disc 18.

Referring to Fig. 6, the numeral 24 indicates the upper conductive surface of the work or working table. In operation, the device is laid upon any part of such surface which is thus in electrical contact with the lower disc 19 through its securing brads 20. The welding generator is indicated by the numeral 25, and the welding electrode by the numeral 26. As shown, conductors 27 and 28 connect the generator to the work or working table and to the welding electrode, respectively. To determine the polarity setting of the generator, the operator contacts the welding electrode 26 with the upper disc 18. This connects the lamp 11 in the welding circuit with the result that one or the other of the electrodes 12 and 13 is caused to glow. Let it be assumed that the electrodes 12 and 13 are respectively connected to the upper and lower discs 18 and 19. If light is seen at the electrode 13, the generator is set for straight polarity welding. If, on the contrary, light is seen at the electrode 12, the generator is set for reversed polarity welding.

Preferably, the upper surface of the upper disc 18 is provided with appropriate notations, such as "—Straight Polarity" and "+Reversed Polarity," as shown in Fig. 1. In this event, of course, precaution should be taken during manufacture to have the lamp's electrodes 12 and 13 positioned to correspond with their respective notations.

It is obvious that certain of the elements entering into the structure which has been described may be readily altered without departing from the spirit of the invention.

What is claimed is:

1. A polarity indicator for use in direct-current arc welding on the conductive surface of the work or working table, which comprises a glow lamp having interior spaced electrodes, and a housing for said lamp having a conducting top and a conducting bottom in electrical connection with said electrodes, said top being formed with an opening for inspection of said electrodes, said bottom being adapted to contact with said surface whereby said lamp is connected in the welding circuit by contact of the welding electrode with said top.

2. A polarity indicator for use in direct-current arc welding on the conductive surface of the work or working table, which comprises a glow lamp having interior spaced electrodes, a circular housing for said lamp comprising an annular band of insulating material and upper and lower metal discs secured to the annular edges of said band, and means for horizontally securing said lamp within said housing and for electrically connecting said electrodes respectively to said upper and lower discs, said upper disc being formed with an opening for inspection of said electrodes, said lower disc being adapted to contact with said surface whereby said lamp is connected in the welding circuit by contact of the welding electrode with said upper disc.

ERNEST E. TISZA.